(12) United States Patent
Richards

(10) Patent No.: US 10,226,154 B2
(45) Date of Patent: Mar. 12, 2019

(54) THAWING RACK

(71) Applicant: Gary Richards, New Windsor, MD (US)

(72) Inventor: Gary Richards, New Windsor, MD (US)

(*) Notice: Subject to any disclaimer, the term of this patent is extended or adjusted under 35 U.S.C. 154(b) by 9 days.

(21) Appl. No.: 15/804,417

(22) Filed: Nov. 6, 2017

(65) Prior Publication Data

US 2018/0125305 A1 May 10, 2018

Related U.S. Application Data

(60) Provisional application No. 62/417,402, filed on Nov. 4, 2016.

(51) Int. Cl.
*A47J 47/20* (2006.01)
*A23L 3/365* (2006.01)

(52) U.S. Cl.
CPC .............. *A47J 47/20* (2013.01); *A23L 3/365* (2013.01); *A23V 2002/00* (2013.01)

(58) Field of Classification Search
CPC ....... A47J 47/20; A23L 3/365; A23V 2002/00
USPC ........................................ 211/85.4
See application file for complete search history.

(56) References Cited

U.S. PATENT DOCUMENTS

| | | | | |
|---|---|---|---|---|
| 1,263,863 A | * | 4/1918 | Crosby | A47J 37/0763 126/339 |
| 1,830,347 A | * | 11/1931 | Camden | B60N 3/007 108/137 |
| 1,836,126 A | * | 12/1931 | Luce | A47B 57/26 108/42 |
| 1,872,740 A | * | 8/1932 | James | A47B 31/06 108/137 |
| 2,015,389 A | * | 9/1935 | Whitted | F25D 25/024 108/143 |
| 2,545,844 A | * | 3/1951 | Cougias | A47B 65/00 211/43 |
| 2,780,365 A | * | 2/1957 | Trainor | D06F 57/122 211/119.1 |
| 4,671,012 A | * | 6/1987 | Merklinger | E06B 9/01 49/55 |
| 5,331,904 A | * | 7/1994 | DiSimone | B25H 1/12 108/143 |
| 5,401,520 A | | 3/1995 | Skaar et al. | |
| 6,655,538 B2 | * | 12/2003 | Saulnier-Matteini | A47B 45/00 211/105.1 |
| 6,691,608 B1 | | 2/2004 | Thompson | |

(Continued)

*Primary Examiner* — Ko H Chan
(74) *Attorney, Agent, or Firm* — Global Intellectual Property Agency, LLC; Daniel Boudwin

(57) ABSTRACT

A thawing rack. The thawing rack includes a base including a plurality of parallel oriented rods, a first end, and an opposing second end. A pair of outermost rods of a first rack are in sliding engagement with a pair of outermost rods of the base at the first end thereof, and a pair of outermost rods of a second rack are in sliding engagement with the pair of outermost rods of the base at the second end thereof. One or more springs are configured to bias the first rack away from the second rack. The first and second racks can be compressed and slid inwardly toward one another and then released when the thawing rack is positioned within a sink basin. The force exerted by the springs causes feet disposed on the distal ends of the first and second racks to frictionally engage the sidewalls of the sink basin.

10 Claims, 2 Drawing Sheets

(56) References Cited

U.S. PATENT DOCUMENTS

| | | | | |
|---|---|---|---|---|
| 6,976,597 B2* | 12/2005 | Jahrling | ............... | F24C 15/168 |
| | | | | 211/153 |
| 7,559,522 B1* | 7/2009 | Hlatky | ................. | A47B 23/02 |
| | | | | 108/1 |
| 8,051,781 B1* | 11/2011 | Vind | ...................... | A47K 3/38 |
| | | | | 108/102 |
| 2008/0271730 A1 | 11/2008 | Takenaka | | |
| 2010/0058934 A1 | 3/2010 | Reevell | | |
| 2015/0282517 A1 | 10/2015 | Williams | | |

* cited by examiner

THAWING RACK

CROSS REFERENCE TO RELATED APPLICATIONS

This application claims the benefit of U.S. Provisional Application No. 62/417,402 filed on Nov. 4, 2016. The above identified patent application is herein incorporated by reference in its entirety to provide continuity of disclosure.

BACKGROUND OF THE INVENTION

The present invention relates to thawing racks. More specifically, the present invention provides a thawing rack having opposing sides tensioned via springs such that the thawing rack may be secured within any size sink.

Many foods such as meat, vegetables, and the like are often stored frozen in order to extend the usable timeline in which they can be safely consumed. Frozen foods, particularly meat, typically must be thawed prior to cooking to allow for efficient and thorough cooking. Frozen food left out on the counter or otherwise out of the freezer will thaw naturally overtime; however, this can be a time-consuming and messy process. Further, food items that are improperly thawed may harbor harmful bacteria and other germs, and may cause individuals to be sick if the food item is not thawed correctly prior to cooking and consumption.

One way to speed the thawing process is to submerge the frozen food in water. Water has a greater thermal conductivity than air, so submerging the frozen food in water causes the food to heat and thaw more quickly than simply leaving the frozen food out on the counter or other surface. While the frozen food submerged in water will thaw faster, the frozen food typically floats to the top, leaving a portion of the frozen food unsubmerged and exposed to the air. This can cause the food to thaw unevenly, which may lead to uneven or incomplete cooking. In order to address these concerns, the present invention provides a thawing rack that can be secured within a sink basin above a submerged frozen food item in order to prevent the frozen food item from floating upward and keep the frozen food item entirely submerged, promoting quicker and more even thawing.

Devices have been disclosed in the known art relating to thawing racks. However, these devices have several drawbacks. Thawing racks in the known art typically are rigid fixed structures that can only be supported on a horizontal planar surface, limiting their utility. Further, the thawing racks in the known art fail to provide an adjustability mechanism such as a spring tensioning system to allow the thawing rack to be secured within a sink of any size.

In light of the devices disclosed in the known art, it is submitted that the present invention substantially diverges in design elements from the known art and consequently it is clear that there is a need in the art for an improvement to existing thawing racks. In this regard the present invention substantially fulfills these needs.

SUMMARY OF THE INVENTION

In view of the foregoing disadvantages inherent in the known types of thawing racks now present in the prior art, the present invention provides a thawing rack wherein the same can be utilized for providing convenience for the user when thawing food items within a kitchen sink. In an exemplary embodiment of the present invention, the thawing rack includes base including a plurality of parallel oriented rods connected by a plurality of perpendicular joining rods, the base including a first end and an opposing second end. A first rack includes a plurality of parallel oriented rods, and a pair of outermost rods of the first rack is in sliding engagement with a pair of outermost rods of the base at the first end thereof. A second rack includes a plurality of parallel oriented rods, and a pair of outermost rods of the second rack is in sliding engagement with the pair of outermost rods of the base at the second end thereof. A spring is disposed annularly about each rod of the pair of outermost rods of the first rack and each rod of the pair of outermost rods of the second rack. The springs are configured to bias the first rack away from the second rack. The first and second racks can be slid inwardly toward one another and then released when the thawing rack is positioned within a sink basin, whereby the springs cause the first and second racks to extend away from one another and frictionally engage the sidewalls of the sink basin.

One object of the present invention is to provide a thawing rack that includes rubber feet for effectively securing the thawing rack against the interior walls of the sink basin.

Another object of the present invention is to provide a thawing rack that includes rubber feet that are adjustable in length so that the thawing rack can be secured within a sink basin of any size.

A further object of the present invention is to provide a thawing rack that can be placed within a sink basin filled with water and secured against the interior walls thereon, such that the thawing rack keeps the entire surface area of a frozen food item submerged within the water.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
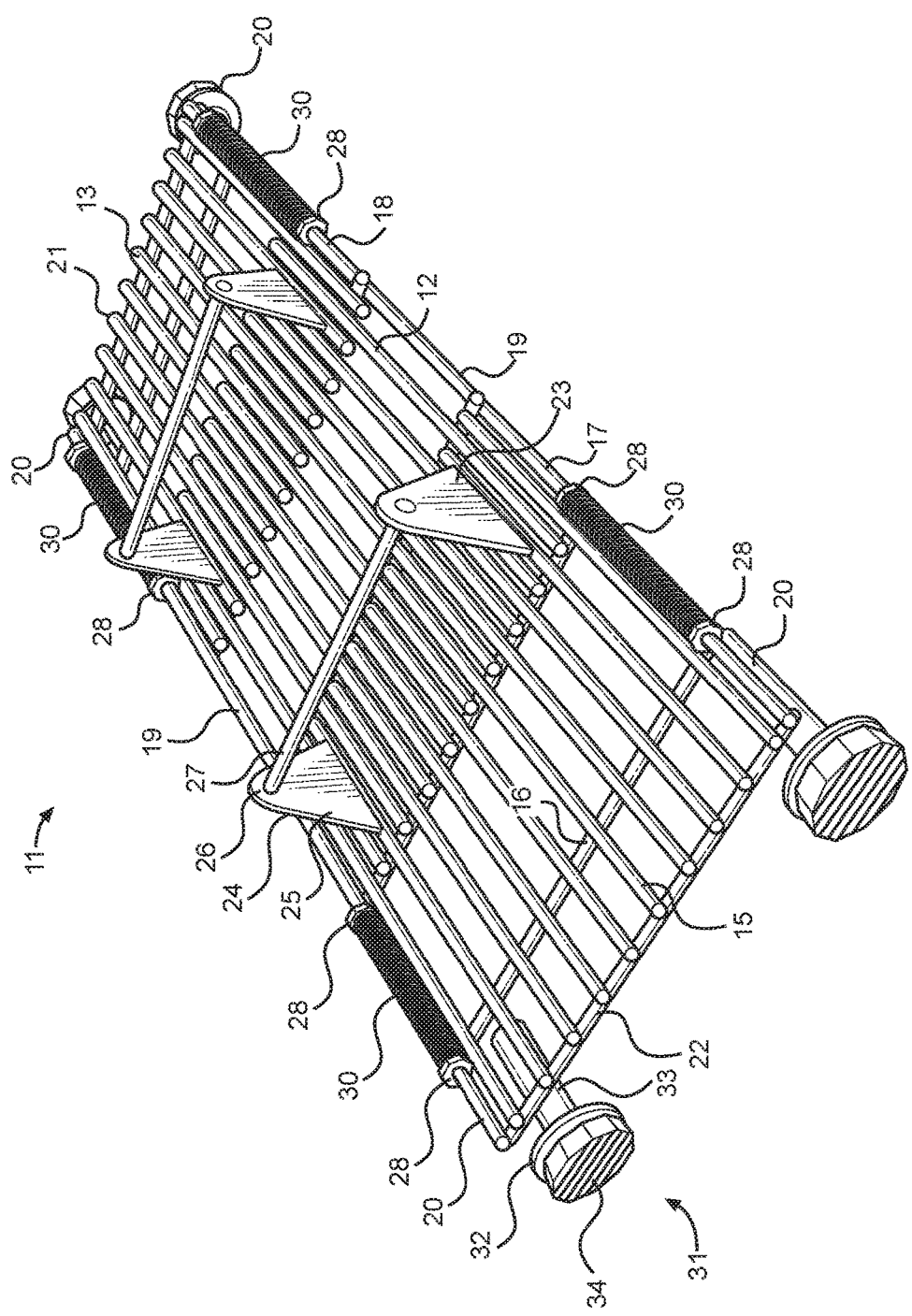
FIG. 1 shows a perspective view of the thawing rack.

Reference is made herein to the attached drawings. Like reference numerals are used throughout the drawings to depict like or similar elements of the thawing rack. For the purposes of presenting a brief and clear description of the present invention, the preferred embodiment will be discussed as used for providing a support surface for thawing food items within a sink. The figures are intended for representative purposes only and should not be considered to be limiting in any respect.

Referring now to FIG. 1, there is shown a perspective view of the thawing rack according to one embodiment of the present invention. The thawing rack generally includes a base 12 having a first end 17 and an opposing second end 18. A first rack 13 is in sliding engagement with the first end 17 of the base 12, and a second rack 14 is in sliding engagement with the second end 18 of the base 12. The base 12, the first rack 13, and the second rack 14 are each composed of a plurality of parallel rods 15 that are connected via one or more perpendicular rods 16 via a series of welds or other attachments along the length thereof. In the illustrated embodiment, the first and second racks 13, 14 are symmetrical to provide stability and reduce construction costs. Further, the base 12, the first rack 13, and the second rack 14 may be composed of metal, plastic, or any other suitably durable material.

The first and second racks 13, 14 are slidably connected to the base 12. In the shown embodiment, an outermost rod 20 of each of the first and second racks 13, 14 slidably engages an outermost rod 19 of the base 12, such that the outermost rod 20 of the first rack 13 engages the outermost rods 19 at the first end 17 of the base 12, and the outermost rods 20 of the second rack engages the outermost rods 19 at the second end 18 of the base 12. In one embodiment, the outermost rods 20 of the first and second racks 13, 14 can be slidably inserted into a hollow interior of the outermost rods 19 of the base 12. Alternatively, the outermost rods 20 of the first and second racks 13, 14 can include a hollow interior which slidably receives the outermost rods 19 of the base.

The thawing rack 11 further includes a plurality of springs 30 configured to bias the first rack 13 away from the second rack 14. In the shown embodiment, a spring 30 is disposed annularly about the outermost rods 20 of the first and second racks 13, 14, such that a total of four springs 30 are utilized. A stopper 28 is disposed on either side of each spring 30, and each stopper 28 has a greater outer diameter than an inner diameter of the springs 30, in order to prevent separation of the first and second racks 12, 13 from the base 12. In one embodiment, a stopper is disposed on each of the outermost rod 19 of the first end 17 of the base 12, the outermost rods 19 of the second end 18 of the base 12, the outermost rods 20 of the first rack 13, and the outermost rods 20 of the second rack 14, providing a total of eight stoppers. In alternate embodiments, a lesser or greater number of stoppers 28 may be utilized, so long as the first rack 13 and second rack 14 are prevented from completely separating from the base 12.

Each of the first and second racks 13, 14 includes a handle 23 thereon. The handle 23 facilitates compression of the first and second rack 13, 14 and allows the thawing rack 11 to be easily manipulated by the user. In the illustrated embodiment, each handle 23 includes a pair of supports 24 and a horizontal member 27 extending therebetween. The pair of supports 24 each taper inwardly from a lower end 25 to an upper end 26 thereof. The thicker lower end 25 provides structural strength along the axis of movement of the first and second racks 13, 14. In use, the user may engage one handle 23 with the thumb and the other handle 23 with the remaining fingers. The user may then may close their hand to compress the first rack 13 toward the second rack 14.

The thawing rack 11 further includes a first pair of feet 31 disposed on a distal end 21 of the first rack 13 and a second pair of feet 31 disposed on a distal end 22 of the second rack 14. The feet 31 include an extension member 33 that extends outwardly from one of the parallel rods 15 in the same direction as a length thereof. A first side of a plate 32 is connected perpendicular to the extension member 33. A cap 34 is disposed on the second side of the plate 32. In use, the cap 34 contacts the interior walls of a sink when the thawing rack 11 is secured therein.

In one embodiment, the plate 32 is adjustably secured to the extension member 33 such that the plate 32 can be extended or retracted therefrom via a threaded connection or other telescoping mechanism. This allows the maximum width of the thawing rack 11 to be increased so that it may be used with larger sinks. In the shown embodiment, the cap 34 has a diameter less than a diameter of the plate 32, so that the cap 34 can compress against the plate 32 when the thawing rack 11 is secured within a sink. The cap 34 is preferably made from rubber or another compressible, high-friction material so that the cap 34 will not slide along the interior wall of a sink basin.

Figure 2:
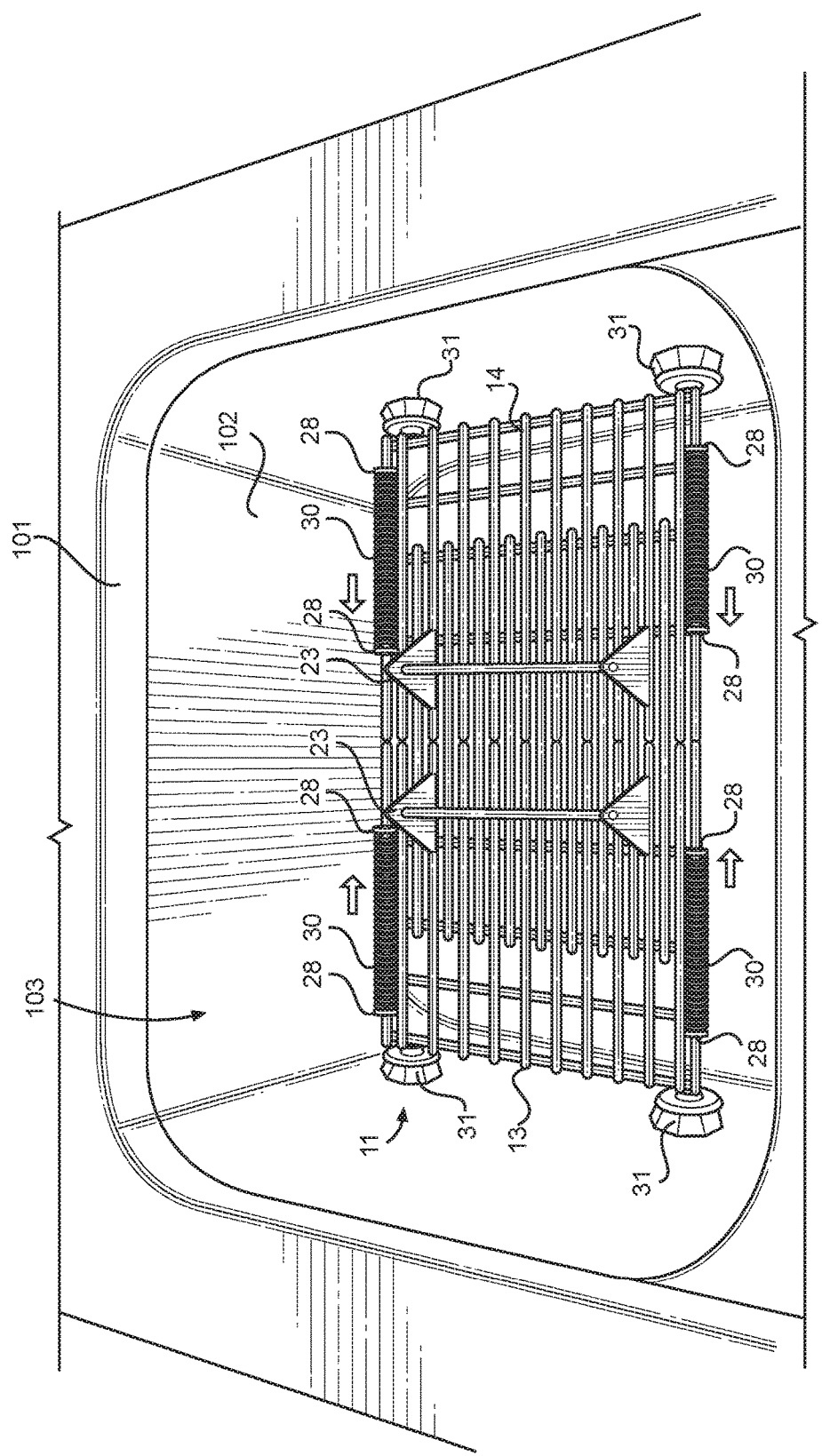
FIG. 2 shows a perspective view of the thawing rack secured within the basin of a sink.

Referring now to FIG. 2, there is shown a perspective view of the thawing rack secured within the basin of a sink. In use, a user may place an item to be thawed in the sink 101. The user may then squeeze the handles 23 of the thawing rack 11 toward one another, causing the first rack 13 and second rack 14 to slide inwardly toward one another, and position the thawing rack 11 within the sink basin 103 above the item to be thawed. When the user releases the handles 23, the springs 30 cause the first and second racks 13, 14 to slide away from one another until the feet 31 contact the sides 102 of the sink basin 103, securing the thawing rack 11 within the sink basin 103 above the thawing item. The stoppers 28 prevent the first and second racks 13, 14 from completely separating and maintain the springs 30 in their desired position.

After securing the thawing rack 11 within the sink basin 103, the user may then fill the sink 101 with water in order to facilitate faster thawing of the frozen item. The thawing rack 11 prevents the thawing item from floating upwardly and ensures that all of the surface area of the thawing item is positioned underwater. In this way, the thawing rack 11 helps to speed the thawing process by keeping the item submerged. In an alternative use, the user may secure the thawing rack 11 within an empty sink 101. The user may then support an item to be drained or thawed directly on the thawing rack 11, so that liquid such as drainage liquid or condensation that forms during the thawing process may drip down into the sink drain.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A thawing rack, comprising:
   a base including a plurality of parallel oriented rods connected by a plurality of perpendicular joining rods, the base including a first end and an opposing second end;
   a first rack comprising a plurality of parallel oriented rods, wherein a pair of outermost rods of the first rack is in sliding engagement with a pair of outermost rods of the base at the first end thereof;
   a second rack comprising a plurality of parallel oriented rods, wherein a pair of outermost rods of the second rack is in sliding engagement with the pair of outermost rods of the base at the second end thereof;

wherein the base, the first rack and the second rack define an upper surface;

wherein the upper surface is configured to hold at least one object thereon;

wherein each of the first rack and the second rack include at least one perpendicular joining rod connected to the corresponding to the plurality of parallel oriented rods;

a spring disposed annularly about each rod of the pair of outermost rods of the first rack and each rod of the pair of outermost rods of the second rack;

wherein the springs are configured to bias the first rack away from the second rack.

2. The thawing rack of claim 1, further comprising:

a first handle disposed on an internal portion of the first rack such that the first handle is disposed between the base and the springs corresponding to the first rack when viewed from an overhead view;

a second handle disposed on an internal portion of the second rack such that the second handle disposed between the base and the springs corresponding to the second rack when viewed from an overhead view;

wherein the first handle and the second handle each includes a pair vertical supports and a rod extending between an upper end of each of the vertical supports.

3. The thawing rack of claim 2, wherein each vertical support includes an inwardly tapering outer edge, such that a lower end of each vertical support includes a width greater than a width of the upper end of each vertical support.

4. The thawing rack of claim 1, further comprising a stopper disposed on each of the pair of outermost rods of the first end of the base, the pair of outermost rods of the second end of the base, the pair of outermost rods of the first rack, and the pair of outermost rods of the second rack, each stopper including an outer diameter greater than an inner diameter of each spring, wherein the stoppers are configured to prevent detachment of the first rack and the second rack from the base.

5. The thawing rack of claim 1, wherein the first rack and the second rack are symmetrical.

6. The thawing rack of claim 1, further comprising a first pair of feet disposed on a distal end of the first rack and a second pair of feet disposed on a distal end of the second rack.

7. The thawing rack of claim 6, wherein the first pair of feet and the second pair of feet each include an extension rod, a plate including a first side attached perpendicularly to each of the extension rods, and a cap attached to a second side of each of the plates.

8. The thawing rack of claim 7, wherein each plate is adjustably connected to its respective extension rod, such that each plate is configured to move between an extended position and a retracted position lengthwise with respect to each extension rod.

9. The thawing rack of claim 8, wherein each cap is composed of a compressible material such that each cap compresses against each plate when pressure is applied upon each cap.

10. The thawing rack of claim 1, wherein each spring is disposed annularly about an external surface of each rod of the pair of outermost rods of the first rack and each rod of the pair of outermost rods of the second rack.

* * * * *